United States Patent
Prasad et al.

(10) Patent No.: US 11,422,702 B2
(45) Date of Patent: Aug. 23, 2022

(54) MANAGING UTILIZATION OF STORAGE CLASS MEMORY (SCM) RESOURCES

(71) Applicant: Dell Products, L.P., Round Rock, TX (US)

(72) Inventors: Parmeshwr Prasad, Bangalore (IN); Rahul Deo Vishwakarma, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 248 days.

(21) Appl. No.: 17/003,190

(22) Filed: Aug. 26, 2020

(65) Prior Publication Data
US 2022/0066645 A1    Mar. 3, 2022

(51) Int. Cl.
*G06F 3/06* (2006.01)
*G06F 12/08* (2016.01)

(52) U.S. Cl.
CPC .......... *G06F 3/0608* (2013.01); *G06F 3/0652* (2013.01); *G06F 3/0673* (2013.01)

(58) Field of Classification Search
None
See application file for complete search history.

(56) References Cited

U.S. PATENT DOCUMENTS

| 10,474,656 | B1 * | 11/2019 | Bronnikov | G06F 16/217 |
| 2009/0307432 | A1 * | 12/2009 | Fleming | G06F 12/0284 |
| | | | | 711/170 |
| 2016/0092108 | A1 * | 3/2016 | Karaje | H04L 67/1097 |
| | | | | 718/103 |
| 2016/0092272 | A1 * | 3/2016 | Karaje | G06F 9/5011 |
| | | | | 718/104 |
| 2019/0179755 | A1 * | 6/2019 | Mudumbai | G06F 12/128 |

FOREIGN PATENT DOCUMENTS

EP    2354954 A1 *    8/2011 .......... G06F 12/0811

* cited by examiner

*Primary Examiner* — Christopher D Birkhimer
(74) *Attorney, Agent, or Firm* — Fogarty LLP (57) ABSTRACT

Methods and systems support managed use of a Storage Class Memory (SCM) by one or more applications operating on an IHS (Information Handling System). The operations that are supported by an IHS processor for flushing data from the SCM are determined. Applications are identified that operate using the persistent data storage capabilities of the SCM. The SCM flushing operations invoked by each these applications are monitored. The utilization of the SCM by each of the first plurality of applications is determined based at least in part on the monitored flushing operations by each application. The utilization of the SCM may also be based on calculated metrics of SCM utilization by the respective applications. The applications are classified based their determined SCM utilizations. Based on the classifications of SCM utilization, a subset of the applications may be identified for removal from use of the SCM.

20 Claims, 3 Drawing Sheets

MANAGING UTILIZATION OF STORAGE CLASS MEMORY (SCM) RESOURCES

FIELD

This disclosure relates generally to Information Handling Systems (IHSs), and more specifically, to management of data storage resources utilized by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs may utilize a variety of data storage devices that range from persistent, long-term data storage drives all the way to volatile, short-term data storage, such as cache memories. Typically, storage devices supporting short-term, volatile data storage operate with low latencies, but are more expensive than storage-devices providing higher latency, persistent data storage. More recently, storage class memory (SCM) devices offer performance similar to volatile memory, but also provide persistent storage of data. These SCM devices may be advantageously utilized by applications operating on an IHS in order to operating using low-latency, persistent data storage. However, SCM devices are typically costly compared to other data storage options. Accordingly, in IHSs that include SCM devices, the storage capacity provided by these SCM devices is limited.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

SUMMARY

In various embodiments, methods are provided for managing use of a Storage Class Memory (SCM) by one or more applications operating on an IHS. The methods may include: determining operations supported by one or more processors of the IHS for flushing data from the SCM that is used to provide persistent data storage; determining a first plurality of the one or more applications that are operating using the persistent data storage capabilities of the SCM; monitoring invocation of the SCM flushing operations by each of the first plurality of applications; determining a utilization of the SCM by each of the first plurality of applications; classifying the first plurality of applications based the utilization of the SCM by the first plurality of applications, wherein the utilization by an application is determined based on the monitored flushing operations by the application; and based on the classifications, identifying a subset of the first plurality of applications to remove from operating using the SCM.

In additional method embodiments, the utilization of the SCM by each of the first plurality of applications is further determined based on a read ratio index that is calculated based on a ratio between a number of read operations and a number of write operations by each of the first plurality of applications. In additional method embodiments, the read ratio index indicates a low utilization of the SCM by an application based on a greater number of read operations than write operations by the application. In additional method embodiments, utilization of the SCM by each of the first plurality of applications is further determined based on latencies of the invoked SCM flushing operations by each of the first plurality of applications. In additional method embodiments, invocation of SCM flushing operations with longer latencies by an application indicates a higher utilization of the SCM by the application. In additional method embodiments, the classification comprises clustering the first plurality of the one or more applications based on the monitored use of the SCM flushing operations by each of the applications, the read ratio index of each of the applications, and the latencies of the SCM flushing operations by each of the applications. In additional method embodiments, the identification of the subset of the first plurality of applications to remove from operating using the SCM is determined by a remote access controller of the IHS. In additional method embodiments, the determination by the remote access controller is based on user input specifying prioritizations for the first plurality of applications.

In various additional embodiments, IHSs (Information Handling System) are provided on which one or more applications operate. The IHSs include: one or more processors supporting a plurality of cache flushing operations; a Storage Class Memory (SCM) that comprises persistent data storage and further comprises volatile cache memory; a plurality of volatile memory devices coupled to the one or more processors, the memory devices storing computer-readable instructions that, upon execution by the one or more processors, cause the system to: determine operations supported by the one or more processors of the IHS for flushing data from the SCM; determine a first plurality of the one or more applications that are operating using the persistent data storage of the SCM; monitor invocation of the SCM flushing operations by each of the first plurality of applications; and determine a utilization of the SCM by each of the first plurality of applications; and a remote access controller comprising a memory device having instructions stored thereon that, upon execution by a logic unit, cause the remote access controller to: classify the first plurality of applications based the utilization of the SCM by the first plurality of applications, wherein the utilization of an application by the first plurality of applications is determined based on the monitored flushing operations by the application; and based on the classifications, identify a subset of the first plurality of applications to remove from operating using the SCM.

In additional IHS embodiments, the utilization of the SCM by each of the first plurality of applications is further determined based on a read ratio index that is calculated based on a ratio between a number of read operations and a number of write operations by each of the first plurality of applications. In additional IHS embodiments, the read ratio index indicates a low utilization of the SCM by an application based on more read operations than write operations by the application. In additional IHS embodiments, utilization of the SCM by each of the first plurality of applications is further determined based on latencies of the invoked SCM flushing operations by each of the first plurality of applications. In additional IHS embodiments, invocation of SCM flushing operations with longer latencies by an application indicates a higher utilization of the SCM by the application. In additional IHS embodiments, the classification comprises clustering the first plurality of the one or more applications based on the monitored use of the SCM flushing operations by each of the applications, the read ratio index of each of the applications, and the latencies of the SCM flushing operations by each of the applications.

In various additional embodiments, computer-readable storage devices are provided having instructions stored thereon for managing use of a Storage Class Memory (SCM) by one or more applications operating on an IHS. Upon execution by one or more processors, the instructions cause the one or more processors to: determine operations supported by one or more processors of the IHS for flushing data from the SCM is used to provide persistent data storage; determine a first plurality of the one or more applications that are operating using the persistent data storage capabilities of the SCM; monitor invocation of the SCM flushing operations by each of the first plurality of applications; determine a utilization of the SCM by each of the first plurality of applications; classify the first plurality of applications based the utilization of the SCM by the first plurality of applications, wherein the utilization of an application is determined based on the monitored flushing operations by the application; and based on the classifications, identify a subset of the first plurality of applications to remove from operating using the SCM.

In additional storage device embodiments, the utilization of the SCM by each of the first plurality of applications is further determined based on a read ratio index that is calculated based on a ratio between a number of read operations and a number of write operations by each of the first plurality of applications. In additional storage device embodiments, the read ratio index indicates a low utilization of the SCM by an application based on a greater number of read operations than write operations by the application. In additional storage device embodiments, utilization of the SCM by each of the first plurality of applications is further determined based on latencies of the invoked SCM flushing operations by each of the first plurality of applications. In additional storage device embodiments, invocation of SCM flushing operations with longer latencies by an application indicates a higher utilization of the SCM by the application. In additional storage device embodiments, the classification comprises clustering the first plurality of the one or more applications based on the monitored use of the SCM flushing operations by each of the applications, the read ratio index of each of the applications, and the latencies of the SCM flushing operations by each of the applications.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. It should be appreciated that although certain IHSs described herein may be discussed in the context of enterprise computing servers, other embodiments may be utilized.

Figure 1:
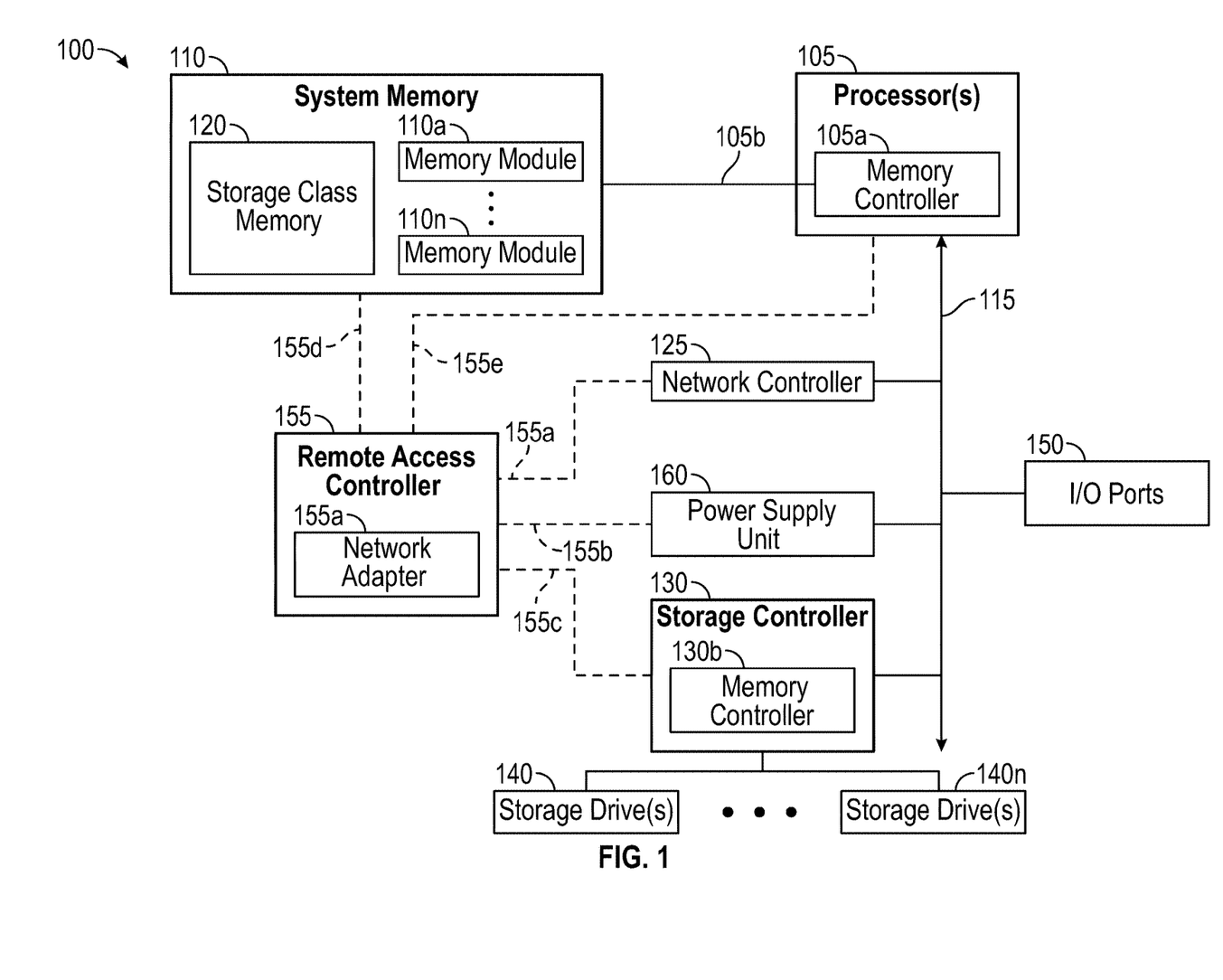
FIG. 1 is a block diagram illustrating certain components of an IHS configured according to various embodiments to manage utilization of the Storage Class Memory (SCM) data storage resources of the IHS.

FIG. 1 illustrates certain components of an IHS 100 configured according to various embodiments to manage utilization of the Storage Class Memory (SCM) data storage resources 120 of the IHS 100. In the illustrative embodiment of FIG. 1, IHS 100 may be a server that would typically be installed within a chassis, that in turn would be installed within slots of a rack. Installed in this manner, IHS 100 may utilize certain shared resources provided by the chassis and/or rack, such as power and networking. In some embodiments, multiple servers such as IHS 100 may be installed within a single chassis. For instance, IHS 100 may be a 1RU (Rack Unit) server that is paired with a similar 1RU component, such as another server similar to IHS 100, and may be installed within a 2RU chassis.

IHS 100 may include one or more processors 105. In some embodiments, processors 205 may include a main processor and a co-processor, each of which may include a plurality of processing cores. As illustrated, processor(s) 105 may include an integrated memory controller 105a that may be implemented directly within the circuitry of the processor 105, or the memory controller 105a may be a separate integrated circuit that is located on the same die as the processor 105. The memory controller 105a may be configured to manage the transfer of data to and from the system memory 110 of the IHS 105 via a high-speed memory interface 105b. Processor 105 may execute one or more operating systems and/or virtual machines, in which a variety of software applications may run. In various embodiments, at least some of these software applications executed by processor 105 may utilize SCM 120 data storage resources supported by IHS 100.

System memory 110 may include volatile memory components, such as such as static RAM (SRAM) and dynamic RAM (DRAM), that are suitable for supporting high-speed memory operations by the processor(s) 105. In certain embodiments, these high-speed components of system memory 110 may be comprised of multiple removable memory modules 110a-n that provide volatile data storage. Each of the removable memory modules 110a-n may utilize a form factor corresponding to a motherboard expansion card socket that receives a type of removable memory module 110a-n, such as a DIMM (Dual In-line Memory Module). Other embodiments of IHS system memory 110 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, system memory 110 may also include non-volatile memory devices, such as NAND Flash memory that operates at significantly slower speeds than the volatile system memory, but provides persistent storage at lower costs than volatile memory.

In the illustrated embodiment, system memory 110 includes both the volatile memory of memory modules 110a-n and persistent, non-volatile memory in the form of a Storage Class Memory (SCM) 120. SCM 120 may include one or more storage devices that operate faster than other types of persistent memory, such as NAND Flash, but slower than volatile system memory, such as DRAM. Accordingly, SCM storage devices typically are less costly than DRAM, but are more expensive than NAND Flash memory. In some instances, SCM modules combine the use of DRAM as cache memory for use in storing data that is actively in use and NAND Flash for a backing store that provides persistent storage of the data. Such SCM modules may be referred to as NVDIMM (Non-Volatile Dual In-line Memory Module) memory in some instances. In some cases, SCM modules may be configured for use strictly as volatile data storage provided by the DRAM capabilities and thus forgoing the additional latency of the data persistence operations that would utilize the NAND Flash capabilities of the SCM module. In some embodiments, power sources provided by IHS 100 for use in supporting SCM 120 persistence may include capacitors, super capacitors, dedicated batteries, or other power storage devices. In some embodiments, the power output of these sources to the individual modules of SCM 120 may be monitored in order to evaluate the utilization of the individual SCM modules.

IHS 100 may operate using a chipset that may be implemented by integrated circuits that couple processor 105 to various other components of the motherboard of IHS 100. In some embodiments, all or portions of the chipset may be implemented directly within the integrated circuitry of an individual processor 105. The chipset may provide the processor(s) 105 with access to a variety of resources accessible via one or more buses 115. Various embodiments may utilize any number of buses to provide the illustrated pathways provided by the single illustrated bus 115. In certain embodiments, bus 115 may include a PCIe (PCI Express) switch fabric that is accessed via a root complex and coupled processor 105 to a variety of internal and external PCIe devices.

In various embodiments, a variety of resources may be coupled to the processor(s) 105 of the IHS 100 via buses 115 managed by the processor chipset. In some cases, these resources may be components of the motherboard of IHS 100 or these resources may be resources coupled to IHS 100, such as via I/O ports 150. In some embodiments, IHS 100 may include one or more I/O ports 150, such as PCIe ports, that may be used to couple the IHS 100 directly to other IHSs, storage resources or other peripheral components. In certain embodiments, the I/O ports 150 may provide couplings to a backplane or midplane of the chassis in which the IHS 100 is installed. In some instances, I/O ports 150 may include rear-facing externally accessible connectors by which external systems and networks may be coupled to IHS 100.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may additionally implement a variety of management capabilities. In some instances, remote access controller 155 operate from a different power plane from the processors 105, storage drives 140a-n and other components of IHS 100, thus allowing the remote access controller 155 to operate, and management tasks to proceed, while the processing cores of IHS 100 are powered off. Various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may include a service processor, or specialized microcontroller, that operates management software that supports remote monitoring and administration of IHS 100. Remote access controller 155 may be installed on the motherboard of IHS 100 or may be coupled to IHS 100 via an expansion slot provided by the motherboard. In some embodiments, remote access controller 155 may support monitoring and administration of various managed devices 105, 110, 125, 130, 160 of an IHS via a sideband bus interface. For instance, messages utilized in device management may be transmitted using I2C sideband bus connections 155a-e that may be individually established with each of the respective managed devices 105, 110, 125, 130, 160 through the operation of an I2C multiplexer of the remote access controller 155. In support of remote monitoring functions utilizing data collected by these sideband bus connections, remote access controller 155 may include a network adapter 155a that may support connections with remote management tools using wired and/or wireless network connections via a variety of network technologies. The network access provided by network adapter 155a is limited to use by remote access controller 155 and is distinct from the network access provided to IHS 100 by network controller 125.

Figure 3:
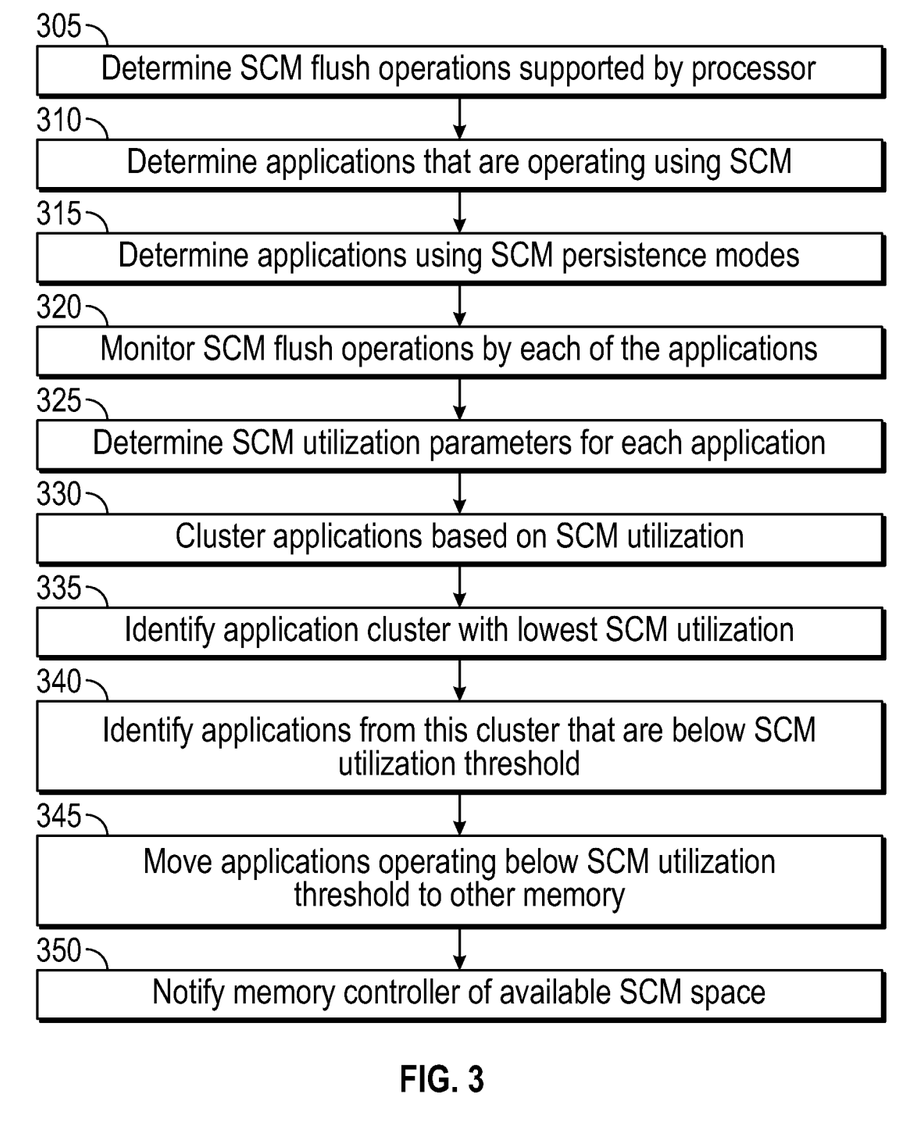
FIG. 3 is a flowchart diagram illustrating certain steps of a method according to various embodiments for managing utilization of the Storage Class Memory (SCM) data storage resources of an IHS.

As described in additional detail with regard to FIG. 3, in some embodiments, remote access controller 155 may support the management of the SCM 120 data storage resources of IHS 100, in some instances in conjunction with one or more management processes that operate within the operating system(s) of IHS 100. For instance, such management processes may monitor the utilization of SCM 120 resources by applications running in the operating system(s) of IHS 100. As described in additional detail below, such monitoring may track the cache flush operations invoked by applications that are utilizing SCM 120 resources. In some embodiments, remote access controller 155 may contribute to the evaluation of the utilization of SCM 120 storage capacity by these applications running within the operating system(s) of IHS 100. In some embodiments, based on the cache utilization data collected by the operating system management process, remote access controller 155 may evaluate this data in order to classify the applications based on their SCM utilization and may determine when to reallocate the storage capacity of SCM 120 to different application running on IHS 100. In such embodiments, remote access controller 155 may specify which applications should remain using SCM 120 and which application should be moved to use of other data storage resources available on IHS 100. In some embodiments, remote access controller 155 may additionally monitor the power provided to individual modules of SCM 120 in order to evaluate the utilization of the individual SCM modules.

As illustrated, IHS 100 may also include a power supply unit 160 that provides the components of the chassis with appropriate levels of DC power. The power supply unit 160 may receive power inputs from an AC power source or from a shared power system that is provided by a rack within which IHS 100 may be installed. In certain embodiments, power supply unit 160 may be implemented as a swappable component that may be used to provide IHS 100 with redundant, hot-swappable power supply capabilities. As illustrated, power supply unit 160 may include a sideband management connection 155b with remote access controller 155. Based on inputs provided by this sideband management connection 155b, power supply unit 160 may implement various power modes that may be remotely monitored and managed. In some embodiments, power provided by power supply unit 160 may be utilized by SCM 120 in supporting persistent data storage.

As illustrated, processor(s) 105 may also be coupled to a network controller 125, such as provided by a Network Interface Controller (NIC) that is coupled to the IHS 100 and allows the IHS 100 to communicate via an external network, such as the Internet or a LAN. Network controller 125 may include various microcontrollers, switches, adapters, and couplings used to connect IHS 100 to a network, where such connections may be established by IHS 100 directly or via shared networking components and connections provided by a rack in which chassis 100 is installed. In some embodiments, network controller 125 may allow IHS 100 to interface directly with network controllers from other nearby IHSs in support of clustered processing capabilities that utilize resources from multiple IHSs. As with power supply unit 160, network controller 125 may include a sideband management connection 155a with remote access controller 155, where this sideband connection 155a may be used for remote monitoring and management of the network controller's operations.

IHS 100 may include one or more storage controllers 130 that may be utilized to access storage drives 140a-n that are accessible via the chassis in which IHS 100 is installed, and, in some cases, to access remote storage drives installed in other chassis that may be within the same rack or in a different rack of a data center, such as within other IHSs that are part of the same logical cluster as IHS 100. Although a single storage controller 130 is illustrated in FIG. 1, IHS 100 may include multiple storage controllers that may be configured identically or in different configurations. In some embodiments, a storage controller 130 of IHS 100 may provide support for RAID (Redundant Array of Independent Disks) configurations of logical and physical storage drives 140a-n. In some embodiments, a storage controller 130 of IHS 100 may be an HBA (Host Bus Adapter) that provides more limited capabilities in accessing physical storage drives 140a-n.

In some embodiments, storage drives 140a-n may be replaceable, hot-swappable storage devices that are installed within bays provided by the chassis in which IHS 100 is installed. In some embodiments, storage drives 140a-n may also be accessed by other IHSs that are also installed within the same chassis as IHS 100. For instance, when installed within a 2RU chassis, IHS 100 may be a 1RU component of the chassis that is able to access storage drives 140a-n along with another 1RU IHS that is also installed within a slot of the 2RU chassis. In embodiments where storage drives 140a-n are hot-swappable devices that are received by bays of chassis, the storage drives 140a-n may be coupled to IHS 100 by connectors provided by the individual bays to a midplane of IHS 100. In various embodiments, storage drives 140a-n may include SAS (Serial Attached SCSI) magnetic disk drives, SATA (Serial Advanced Technology Attachment) magnetic disk drives, solid-state drives (SSDs) and other types of storage drives in various combinations. As with processor(s) 105, storage controller 130 may also include an integrated memory controller 130b that may be used to manage the transfer of data to and from the storage drives 140a-n managed by storage controller 130. As with power supply unit 160 and network controller 125, storage controller 130 may include a sideband management connection 155c with remote access controller 155, where this sideband connection 155c may be used for remote monitoring and management of the storage controller's operations.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip.

Figure 2:
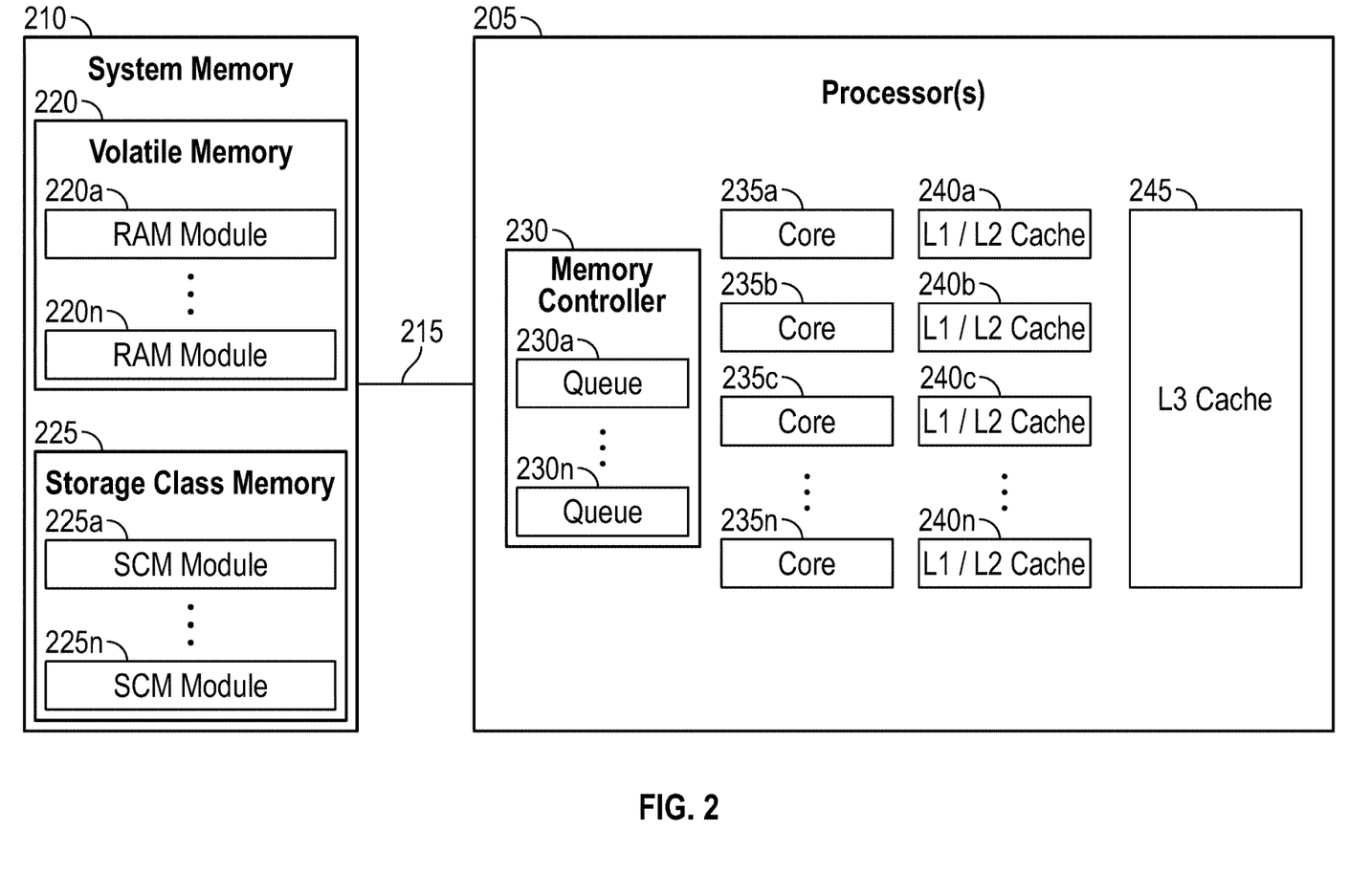
FIG. 2 is a block diagram illustrating certain data storage components of an IHS, configured according to various embodiments, where the data storage components include SCM data storage resources.

FIG. 2 is a block diagram illustrating certain data storage components of an IHS, configured according to various embodiments, where the data storage components include SCM 225 data storage resources. As described with regard to FIG. 1, an IHS may include a main processor that may execute one or more operating systems and/or virtual machines. A variety of software applications may run within these operating systems and/or virtual machines. Some or all of these software applications executed by processor 205 may utilize SCM 225 data storage resources supported by system memory 210. Also as described with regard to FIG. 1, processor 205 may utilize a memory controller 230 that is configured to manage the transfer of data to and from the system memory 210 via one or more high-speed memory interfaces 215.

As illustrated, processor 205 may include multiple processing cores 235a-n that each provide separate processing units. One or more software applications may be operated by each of the cores 235a-n, where some or all of these software applications may utilize SCM 225 resources. Also as illustrated in FIG. 2, processor 205 may also include on or more separate Level 1/Level 2 (L1/L2) cache memories that support extremely fast data operations, but are limited in size. The L1 cache typically provides faster operations than an L2 cache, but has a more limited capacity. In some embodiments, L1/L2 cache memories may be embedded components of the die of processor 205. In some embodiments, each processor core 235a-n may utilize a dedicated set of L1 and L2 cache memories. Also, as illustrated processor 205 may include an L3 cache memory. Like the L1 and L2 caches, the L3 is a volatile memory that provides applications with additional caching resources. An L3 cache typically provides significantly slower performance than L1 and L2 cache memories, but provides significantly more storage. In managing memory resources, data that is stored in an L1 cache may be flushed to an L2 cache and subsequently flushed to an L3 cache. In some embodiments, all of the processing cores 235a-n may utilize a single, shared L3 cache.

In general, L1, L2 and L3 caches provide volatile memory resources such that all of the data stored in these caches is lost when these caches are no longer powered. Accordingly, data stored in these cache memories may be persisted by flushing the data to be preserved to a non-volatile memory. Such flushing operations may also be utilized to free space in these cache memories for use by different software applications. For instance, space may be freed for use by an application in the L1 to the L2 cache by flushing data to the L3 cache. In some instances, space may be freed in the cache memories by flushing data to the SCM 225 of the system memory 210, which also serves to store this flushed data in a persistent manner. In some embodiments, memory controller 230 may be tasked with storing data flushed from L3 cache 245 to system memory 210, where the flushed data may be stored to conventional volatile memory 220, such as DRAM modules 220a-n, or to SCM modules 225a-n. As illustrated, memory controller 230 may include a number of queues 230a-n for use in transferring data between L1, L2 and L3 cache memories and system memory 210.

As described, system memory 210 may include an SCM 225 that may consist of one or more SCM modules 225a-n. In some instance, the modules of SCM 225 may operate with latencies comparable to the latencies provided by conventional volatile system memory, such as DRAM. However, unlike volatile, SCM 225 provides persistent data storage. In various embodiments, SCM 225 may be implemented by modules 225a-n that may be phase change memory (PCM) NVRAM modules, resistive random access memory (RRAM) modules, magnetic random access memory (MRAM) modules, ferroelectric random access memory (FRAM), NVDIMM, and/or battery-backed DRAM modules. In some embodiments, each of the SCM modules 225a-n may be separately powered in supporting data persistence by these modules. In such embodiments, the power drawn by the individual SCM modules 225a-n may be monitored in order to evaluate the utilization of the individual modules.

Due to the ability to support high-speed memory operations on par with conventional volatile system memory while also supporting persistent data storage, SCM 225 resources are typically in high demand by applications operating on an IHS. However, in some instances, applications are allocated SCM capacity, but these SCM allocations are underutilized. In some cases, the underutilized SCM allocations remain idle even though other applications would be able to make better use of these SCM allocations. Accordingly, embodiments provide techniques for managing the SCM capacity of an IHS based on evaluation of the existing use of the SCM capacity.

FIG. 3 is a flowchart diagram illustrating certain steps of a method according to various embodiments for managing utilization of the Storage Class Memory (SCM) data storage resources of an IHS. Some embodiments may begin, at block 305, with the determination of cache memory flushing operations that are supported by a processor of an IHS. In some instances, processors support instructions that provide responses that relay certain capabilities of the processor. For example, certain INTEL processors support a CPUID instruction that returns a bitstream that encodes a set of labels that identify the cache flushing operations supported by a particular processor. Using these flush operations supported by a processor, software applications may manage available cache capacity by flushing data from the various cache memories supported by the processor, including from SCM modules. In some embodiments, the flushing operations supported by a processor of an IHS may be determined by an operating system process that is configured according to embodiments for managing the utilization of SCM resources by applications running in the operating system of the IHS.

At block 310, this management process may continue by determining the software applications of an IHS that are currently utilizing SCM storage capacity. In some embodiments, the applications using SCM resources may be determined through queries supported by the individual SCM modules and/or by a memory controller that manages access to the SCM modules. For instance, such a query may return a list of files, where each file represents blocks of SCM data that are being stored on behalf of a particular application. In some embodiments, at block 315, the management process may further determine which of these applications are utilizing the persistence capabilities supported by SCM modules. As described above, in certain instances, SCM modules may be used in the same manner as volatile memory, thus forgoing the persistence capabilities of the SCM modules. In some embodiments, the described management of SCM capacity may be limited to managing SCM capacity by applications that are utilizing SCM modules to provide persistent data storage, such that non-persistent SCM capacity may be managed in the same manner as volatile memory capacity.

For these applications with SCM utilization that is being managed according to embodiments, at block 320, the SCM flushing operations invoked by these applications are monitored. In some embodiments, the described management process may utilize SCM software libraries that have been adapted to track and report the invocation of certain flushing operations by software applications utilizing SCM resources. For instance, many software applications may utilize SCM resources via software provided by PMDK (Persistent Memory Development Kit) libraries and/or DAX (Direct Access) libraries. In such instances, these libraries may be instrumented to track and report the software applications that invoke some or all of the cache flushing operations supported by these libraries. For instance, an SCM flushing operation that may be monitored in this manner is in the CLFLUSH instruction that flushes cached data from all of the cache memories utilized by a processor, including from SCM modules. Another SCM flushing operation that may be monitored is the CLFLUSHOPT instruction that similarly flushes cached data from all cache memories, including from SCM modules, but does so in an optimized manner that reduces latencies of flushing operations by forgoing serialization operations of the CLFLUSH instruction that enforce ordering of memory instructions. The monitoring of flushing operations may further include monitoring the invocations of the CLWB instruction that operates in a similar manner to the CLFLUSHOPT, but operates with less latency by persisting data from cache memories but allowing actual eviction of the data from the cache memory to be deferred until the cache location is actually overwritten with new data.

Based on monitoring of such SCM flushing operations, the management process may determine the utilization of the SCM storage capacity by the applications running in the operating system of an IHS. In some embodiments, at block 325, the monitoring process may determine additional parameters of the SCM utilization for each of these applications. For instance, an index may be calculated for each application that characterizes the ratio between the number of read operations and the number of write operations by an application. Since flushing of data from a cache typically only results from write operations and not from read operations, applications that are conducting a greater ratio of write operations to read operations are typically making greater use of available caching resources and invoking a greater number of cache flushing instructions. On the other hand, applications that are conducting a greater ratio of read operations to write operations are utilizing fewer cache resources and thus requesting fewer cache flushes.

In certain embodiments, the monitoring process may additionally or alternatively calculate an index for each application that characterizes the latencies of the caching operations that are invoked. As described, caching operations may vary with regard to their latencies. For instance, a CLFLUSH instruction may have a latency that is multiple orders of magnitude greater than the latency of a CLWB instruction. Accordingly, applications relying on a greater number of CLFLUSH instructions will tend to encumber an SCM module for longer periods compared to applications relying on the same number of CLWB instructions. As such, based on the number and type of cache instructions utilized by an application, the monitoring process may generate an index that characterizes the latencies associated with the cache flushing operations that are invoked by each application.

Based on the SCM utilization data collected and/or calculated by the management process, at block 330, the applications that are using SCM resources may be classified according to this utilization data. Some embodiments may classify the applications using a clustering algorithm such as KNN or DBSCAN. Using such types of classification algorithms, each of the applications that are utilizing SCM storage capacity are assigned to clusters, where applications assigned to the same clusters have similar utilizations of SCM resources. At block 335, the clusters are ordered based on the degree of SCM utilization associated with the respective clusters. For instance, a top ranked cluster may include applications that invoke the most SCM flush operations, that also have the highest ratio of write operations and that operate using the greatest cache flushing latencies. The next ranked cluster may include applications that invoke a similar number of SCM flush operations, but utilize flush operations with lower latencies and have a lower ratio of write operations. A lower ranked cluster may include applications that invokes a low number of SCM flush operations, but the flush operations that are invoked have high latencies. The lowest ranked cluster may include applications that invoke few SCM flush operations and thus are storing data in an allocated portion of SCM capacity, but are not actively using this allocation of SCM capacity. In some embodiments, the clustering may also consider the monitored power that is being drawn by the SCM modules in use by each application, where applications utilizing SCM resources from an SCM module with a low power draw indicating a low utilization of that module's SCM persistence capabilities, thus lowering the ranking of that application.

At block 340, one or more applications from the lowest ranked cluster are identified that are operating using SCM capacity, but are doing so below an SCM utilization threshold. In some embodiments, such a threshold may be determined based on user inputs that specify preferences for use of SCM resources. In some embodiments, this SCM utilization threshold may specify a minimum number of flushing operations per unit of time that must be invoked by an application in order to retain use of SCM resources. At block 345, the applications that are identified as operating below the SCM utilization threshold may be moved to other memory. For instance, the memory controller may be configured to move data from an application's allotted SCM capacity to a volatile memory, such as DRAM. In some instances, such as when an application's SCM utilization indicates that few memory operations are being conducted by the application, the application's data may be moved from its allotted SCM capacity to permanent memory.

With the SCM storage capacity freed by moving data of applications with low SCM utilization to other data storages, at block 350, the memory controller may utilize this available SCM capacity. In some instances, the available SCM capacity may be allocated to applications in the highest ranked cluster since these applications have demonstrated an ongoing reliance on SCM storage capabilities. In other instances, the available SCM capacity may be allocated to other applications that are not presently using SCM resources. In some embodiments, the memory controller may monitor cache misses by applications in order to identify applications that are actively using memory resources and would most benefit from use of the available SCM capacity. In this manner, the SCM storage capacity may be managed in a manner that ensures applications that have been allotted use of SCM resources are actually utilizing these resources. Embodiments thus reduce the amount of SCM capacity that remains idle and increase the utilization of the SCM capacity.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing use of a Storage Class Memory (SCM) by one or more applications operating on an Information Handing System (IHS), the method comprising:
   determining operations supported by one or more processors of the IHS for flushing data from the SCM that is used to provide persistent data storage;
   determining a first plurality of the one or more applications that are operating using the persistent data storage capabilities of the SCM;
   monitoring invocation of the SCM flushing operations by each of the first plurality of applications;
   determining a utilization of the SCM by each of the first plurality of applications;
   classifying the first plurality of applications based the utilization of the SCM by the first plurality of applications, wherein the utilization by an application is determined based on the monitored flushing operations by the application; and
   based on the classifications, identifying a subset of the first plurality of applications to remove from operating using the SCM.

2. The method of claim 1, wherein the utilization of the SCM by each of the first plurality of applications is further determined based on a read ratio index that is calculated based on a ratio between a number of read operations and a number of write operations by each of the first plurality of applications.

3. The method of claim 2, wherein the read ratio index indicates a low utilization of the SCM by an application based on a greater number of read operations than write operations by the application.

4. The method of claim 2, wherein utilization of the SCM by each of the first plurality of applications is further determined based on latencies of the invoked SCM flushing operations by each of the first plurality of applications.

5. The method of claim 4, wherein invocation of SCM flushing operations with longer latencies by an application indicates a higher utilization of the SCM by the application.

6. The method of claim 4, wherein the classification comprises clustering the first plurality of the one or more applications based on the monitored use of the SCM flushing operations by each of the applications, the read ratio index of each of the applications, and the latencies of the SCM flushing operations by each of the applications.

7. The method of claim 1, wherein the identification of the subset of the first plurality of applications to remove from operating using the SCM is determined by a remote access controller of the IHS.

8. The method of claim 7, wherein the determination by the remote access controller is based on user input specifying prioritizations for the first plurality of applications.

9. An IHS (Information Handling System) on which one or more applications operate, the IHS comprising:
   one or more processors supporting a plurality of cache flushing operations;
   a Storage Class Memory (SCM) that comprises persistent data storage and further comprises volatile cache memory;
   a plurality of volatile memory devices coupled to the one or more processors, the memory devices storing computer-readable instructions that, upon execution by the one or more processors, cause the system to:
      determine operations supported by the one or more processors of the IHS for flushing data from the SCM;
      determine a first plurality of the one or more applications that are operating using the persistent data storage of the SCM;
      monitor invocation of the SCM flushing operations by each of the first plurality of applications; and
      determine a utilization of the SCM by each of the first plurality of applications; and
   a remote access controller comprising a memory device having instructions stored thereon that, upon execution by a logic unit, cause the remote access controller to:
      classify the first plurality of applications based the utilization of the SCM by the first plurality of applications, wherein the utilization by an application of the first plurality of applications is determined based on the monitored flushing operations by the application; and
      based on the classifications, identify a subset of the first plurality of applications to remove from operating using the SCM.

10. The IHS of claim 9, wherein the utilization of the SCM by each of the first plurality of applications is further determined based on a read ratio index that is calculated based on a ratio between a number of read operations and a number of write operations by each of the first plurality of applications.

11. The IHS of claim 10, wherein the read ratio index indicates a low utilization of the SCM by an application based on more read operations than write operations by the application.

12. The IHS of claim 10, wherein utilization of the SCM by each of the first plurality of applications is further determined based on latencies of the invoked SCM flushing operations by each of the first plurality of applications.

13. The IHS of claim 12, wherein invocation of SCM flushing operations with longer latencies by an application indicates a higher utilization of the SCM by the application.

14. The IHS of claim 13, wherein the classification comprises clustering the first plurality of the one or more applications based on the monitored use of the SCM flushing operations by each of the applications, the read ratio index of each of the applications, and the latencies of the SCM flushing operations by each of the applications.

15. A computer-readable storage device having instructions stored thereon for managing use of a Storage Class Memory (SCM) by one or more applications operating on an Information Handing System (IHS), wherein upon execution by one or more processors, the instructions cause the one or more processors to:
  determine operations supported by one or more processors of the IHS for flushing data from the SCM that is used to provide persistent data storage;
  determine a first plurality of the one or more applications that are operating using the persistent data storage capabilities of the SCM;
  monitor invocation of the SCM flushing operations by each of the first plurality of applications;
  determine a utilization of the SCM by each of the first plurality of applications:
  classify the first plurality of applications based the utilization of the SCM by the first plurality of applications, wherein the utilization by an application is determined based on the monitored flushing operations by the application; and
  based on the classifications, identify a subset of the first plurality of applications to remove from operating using the SCM.

16. The computer-readable storage device of claim 15, wherein the utilization of the SCM by each of the first plurality of applications is further determined based on a read ratio index that is calculated based on a ratio between a number of read operations and a number of write operations by each of the first plurality of applications.

17. The computer-readable storage device of claim 16, wherein the read ratio index indicates a low utilization of the SCM by an application based on a greater number of read operations than write operations by the application.

18. The computer-readable storage device of claim 16, wherein utilization of the SCM by each of the first plurality of applications is further determined based on latencies of the invoked SCM flushing operations by each of the first plurality of applications.

19. The computer-readable storage device of claim 18, wherein invocation of SCM flushing operations with longer latencies by an application indicates a higher utilization of the SCM by the application.

20. The computer-readable storage device of claim 19, wherein the classification comprises clustering the first plurality of the one or more applications based on the monitored use of the SCM flushing operations by each of the applications, the read ratio index of each of the applications, and the latencies of the SCM flushing operations by each of the applications.

* * * * *